(12) United States Patent
Li et al.

(10) Patent No.: US 10,819,230 B2
(45) Date of Patent: Oct. 27, 2020

(54) DC VOLTAGE CONVERSION CIRCUIT, DC VOLTAGE CONVERSION METHOD AND LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Wenfang Li, Shenzhen (CN); Dan Cao, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/615,363

(22) PCT Filed: Dec. 4, 2017

(86) PCT No.: PCT/CN2017/114389
§ 371 (c)(1),
(2) Date: Nov. 20, 2019

(87) PCT Pub. No.: WO2019/015215
PCT Pub. Date: Jan. 24, 2019

(65) Prior Publication Data
US 2020/0177077 A1    Jun. 4, 2020

(30) Foreign Application Priority Data
Jul. 19, 2017 (CN) .......................... 2017 1 0592619

(51) Int. Cl.
*H02M 3/07* (2006.01)
*G09G 3/36* (2006.01)
*H02M 3/158* (2006.01)

(52) U.S. Cl.
CPC ............ *H02M 3/07* (2013.01); *G09G 3/3696* (2013.01); *G09G 2320/0204* (2013.01); *H02M 3/158* (2013.01)

(58) Field of Classification Search
CPC .......... H02M 3/06; H02M 3/07; H02M 3/073; H02M 3/156; H02M 3/158;
(Continued)

(56) References Cited

U.S. PATENT DOCUMENTS 8,339,819 B2 * 12/2012 Miyazaki ............. G09G 3/3696
363/60
8,362,756 B2 *  1/2013 Weinstein ........... H02M 3/1588
323/288

(Continued)

*Primary Examiner* — Matthew V Nguyen
(74) *Attorney, Agent, or Firm* — Benesch, Friedlander, Coplan & Aronoff LLP

(57) ABSTRACT

Disclosed are a DC voltage conversion circuit, a DC voltage conversion method and a liquid crystal display device. The circuit comprises: a boost circuit 1, a charge pump circuit 2, and a control circuit 3; the control circuit is additionally provided with a first current detection module 201, a second current detection module 202, and an AND gate Y1; a first current I1 in the boost circuit 1 is detected by means of the first current detection module 201, and a high level or a low level is supplied to a first input end of the AND gate Y1 according to the magnitude of the first current I1; a second current I2 in the charge pump circuit 2 is detected by means of the second current detection module 202, and a high level or a low level is supplied to a second input end of the AND gate Y1 according to the magnitude of the second current I2; when the first current I1 is relatively small and the second current I2 is relatively large, namely the boost circuit 1 is at (Continued)

a light load and the charge pump circuit 2 is at a heavy load, a level at the output end of the AND gate Y1 is used to control a switch module 301 to increase the switch frequency of the switch module 301, so that the normal work of the charge pump circuit 2 is ensured, and the stability of the VGH voltage is improved.

8 Claims, 2 Drawing Sheets

(58) Field of Classification Search
CPC . H02M 2001/0003; H02M 2001/0006; H02M 2001/0009; G09G 3/3696; G09G 2320/0204
See application file for complete search history.

(56) References Cited

U.S. PATENT DOCUMENTS

| | | | |
|---|---|---|---|
| 2005/0047181 A1* | 3/2005 | Yamamoto | H02M 3/07 363/60 |
| 2007/0127277 A1* | 6/2007 | Fujiwara | H02M 3/07 363/59 |
| 2014/0092656 A1* | 4/2014 | Aiura | H02M 3/07 363/59 |

* cited by examiner

DC VOLTAGE CONVERSION CIRCUIT, DC VOLTAGE CONVERSION METHOD AND LIQUID CRYSTAL DISPLAY DEVICE

FIELD OF INVENTION

The present disclosure relates to the field of display technologies, and more particularly to a direct current (DC) voltage conversion circuit, a DC voltage conversion method, and a liquid crystal display device.

BACKGROUND OF INVENTION

With the development of display technologies, flat display devices such as liquid crystal displays (LCDs) are widely used in mobile phones, televisions, etc. due to their high image quality, power saving, thin body, and wide application. Personal digital assistants, digital cameras, notebook computers, desktop computers and other consumer electronic products have become a mainstream in display devices.

Liquid crystal panels are core components of liquid crystal display devices. The liquid crystal panel usually includes a color filter (CF) substrate, a thin film transistor (TFT) array substrate, and a liquid crystal layer disposed between the two substrates. A pixel electrode and a common electrode are respectively disposed on the array substrate and the color filter substrate. When a voltage is applied to the pixel electrode and the common electrode, an electric field is generated in the liquid crystal layer, which determines orientation of liquid crystal molecules, thereby adjusting polarization of light incident on the liquid crystal layer, so that the liquid crystal panel displays an image.

In the prior art, when the TFT-LCD is driven, an input to the TFT-LCD includes multiple voltages inside, such as an analog power supply voltage (VAA), a digital power supply voltage (VDD), a gate turn-on voltage (VGH), and a gate turn-off voltage (VGL). Currents of VAA and VDD are large, usually generated by a boost circuit or a buck circuit. Currents corresponding to VGH and VGL are small, and are generally generated by a lower cost charge pump circuit.

Specifically, in the prior art, the boost circuit of the VAA is used to generate a driving voltage VLX for boosting a charge pump circuit that drives VGH. The boost circuit of the VAA is also used for the driving voltage VLX that boosts the charge pump circuit that drives the VGH. The driving voltage VLX generated by the boost circuit of the VAA has the following drawbacks: When a load on the VAA is small (i.e., light load), the boost circuit of the VAA enters a discontinuous mode. At this time, a switching frequency of the driving voltage VLX generated by the boost circuit of the VAA also becomes very low, as shown in FIG. 1. If a load on the VGH is heavy at this time, the driving voltage VLX with a very low switching frequency will not stably drive the VGH to drive the load, so that the voltage of the VGH cannot be stabilized, which affects normal operation.

SUMMARY OF INVENTION

An object of the present invention is to provide a direct current (DC) voltage conversion circuit capable of automatically adjusting a switching frequency of a switching module according to a load of a boost circuit and a charge pump circuit to ensure normal operation of the charge pump circuit.

Another object of the present invention is to provide a DC voltage conversion method capable of automatically adjusting a switching frequency of a switch module according to a load of the boost circuit and a charge pump circuit to ensure normal operation of the charge pump circuit.

Another object of the present invention is further to provide a liquid crystal display device capable of automatically adjusting a switching frequency of a switch module according to a load of a boost circuit and a charge pump circuit to ensure normal operation of the charge pump circuit.

To achieve the above object, the present invention provides a DC voltage conversion circuit comprising: a boost circuit, a charge pump circuit, and a control circuit;

The boost circuit comprises an inductor, a first diode, and a first capacitor; the charge pump circuit comprises a second capacitor, a third capacitor, a second diode, a third diode, and a triode; and the control circuit comprises a switch module, an AND gate, a first current detection module, a second current detection module, a boost control module, and a charge pump control module;

A first end of the inductor is connected to an input voltage, and a second end of the inductor is electrically connected to a first node; an anode of the first diode is electrically connected to the first node, and a cathode of the first diode is configured to output an analog power voltage; a first end of the first capacitor is electrically connected to the cathode of the first diode, and a second end of the first capacitor is grounded; a first end of the second capacitor is electrically connected to the first node, and a second end of the second capacitor is electrically connected to a cathode of the second diode; an anode of the second diode is electrically connected to the cathode of the first diode; an anode of the third diode is electrically connected to the cathode of the second diode, and a cathode of the third diode is electrically connected to a first end of the third capacitor; a second end of the third capacitor is grounded; a base of the triode is electrically connected to the charge pump control module, an emitter of the triode is electrically connected to the cathode of the third diode, and a collector of the triode is configured to output a gate turn-on voltage;

A control end of the switch module is electrically connected to a first end of the boost control module, the first end of the boost control module is electrically connected to the first node, and a second end of the boost control module is grounded; the second end of the boost control module is electrically connected to an output end of the AND gate; the first current detection module is configured to collect a first current, when the first current is greater than a preset first comparison current, the first current detection module provides a low level to a first input end of the AND gate, and when the first current is less than the preset first comparison current, the first current detection module provides a high level to the first input end of the AND gate; the first current is a current connected to a second end of the switch module;

The second current detection module is configured to collect a second current, when the second current is greater than a preset second comparison current, the second current detection module provides a high level to a second input end of the AND gate, and when the second current is less than the preset second comparison current, the second current detection module provides a low level to the second input end of the AND gate; the second current is a current connected to the collector of the triode;

The boost control module is configured to control on and off of the switch module, and control a switching frequency of the switch module according to a level of the output end of the AND gate, when a level of the output end of the AND gate is low, the boost control module controls the switch module to maintain a current switching frequency, and when the level of the output end of the AND gate is high, the boost control module controls the switch module to increase the current switching frequency; and The charge pump control module is configured to control on and off of the triode.

The first current detection module comprises a first current comparator and an inverter;

A non-inverting input end of the first current comparator is electrically connected to the second end of the switch module, an inverting input end of the first current comparator is connected to a first comparison current, and an output end of the first current comparator is electrically connected to an input end of the inverter; an output end of the inverter is electrically connected to the first input end of the AND gate.

The second current detection module comprises a second current comparator;

A non-inverting input end of the second current comparator is electrically connected to the collector of the triode, an inverting input end of the second current comparator is connected to a second reference current, and an output end of the second current comparator is electrically connected to the second input end of the AND gate.

The control circuit is integrated in a power manage IC.

The first diode, the second diode, and the third diode are Schottky diodes.

The switch module comprises a MOS transistor and a resistor;

A gate of the MOS transistor is electrically connected to the boost control module, a source of the MOS transistor is electrically connected to a first end of the resistor, and a drain of the MOS transistor is electrically connected to the first node; a second end of the resistor is grounded;

The gate of the MOS transistor is the control end of the switch module, the drain of the MOS transistor is the first end of the switch module, and the second end of the resistor is the second end of the switch module.

The present invention provides a DC voltage conversion method applied to the above DC voltage conversion circuit of comprising following steps:

Step S1, the boost control module repeatedly switching the switch module, and the boost circuit boosting the input voltage to obtain the analog power voltage;

Step S2, the charge pump circuit boosting an analog power supply voltage by using a voltage of the first node to generate a gate turn-on voltage, and the charge pump control module controlling the triode to conduct, the gate turn-on voltage being output from the collector of the triode;

Step S3, the first current detection module configured to collect the first current, when the first current is greater than the preset first comparison current, the first current detection module provides the low level to the first input end of the AND gate, and when the first current is less than the preset first comparison current, the first current detection module provides the high level to the first input end of the AND gate; wherein the first current is the current connected to the second end of the switch module;

Step S4, the second current detection module configured to collect the second current, when the second current is greater than the preset second comparison current, the second current detection module provides the high level to the second input end of the AND gate, and when the second current is less than the preset second comparison current, the second current detection module provides the low level to the second input end of the AND gate; wherein the second current is the current connected to of the collector of the triode;

Step S5, the boost control module receiving a level of the output end of the AND gate, and when the level of the output end of the AND gate is low, the boost control module controls the switch module to maintain the current switching frequency, and when the level of the output of the AND gate is high, the switch module is controlled to increase the current switching frequency.

The present further provides a liquid crystal display device comprising the above DC voltage conversion circuit.

Beneficial effects of the present disclosure are that, the present invention provides a DC voltage conversion circuit comprising a boost circuit, a charge pump circuit, and a control circuit. A first current detection module, a second current detection module, and an AND gate are added to the control circuit. A first current is detected in the boost circuit by the first current detection module, and a high level or a low level is provided to a first input end of the AND gate according to magnitude of the first current. A second current is detected in the charge pump circuit by the second current detection module, and a high level or a low level is provided to a second input end of the AND gate according to magnitude of the second current. Level of an output end of the AND gate controls the switch module to be smaller at the first current and larger at the second current, that is, when the boost circuit is lightly loaded and the charge pump circuit s is under heavy load, a switching frequency of the switch module is raised to ensure a normal operation of the charge pump circuit, thereby improving stability of VGH voltage. The present invention further provides a DC voltage conversion method capable of automatically adjusting a switching frequency of a switch module according to a load of the boost circuit and a charge pump circuit to ensure normal operation of the charge pump circuit. The present invention further provides a liquid crystal display device capable of automatically adjusting a switching frequency of a switch module according to a load of a boost circuit and a charge pump circuit to ensure normal operation of the charge pump circuit.

DESCRIPTION OF DRAWINGS

In order to further understand the features and technical contents of the present invention, please refer to the following detailed description of the invention and the accompanying drawings. However, the drawings are only provided for reference and explanation, and it is not intended to limit the invention.

In the drawings.

DETAILED DESCRIPTION OF PREFERRED EMBODIMENTS

In order to further clarify the technical means and effects of the present invention, the following detailed description will be made in conjunction with the preferred embodiments of the invention and the accompanying drawings.

Figure 1:
FIG. 1 is a waveform diagram of a driving voltage VLX when a boost circuit in the prior art is in a discontinues mode.

Referring to FIG. 1, the present invention provides a DC voltage conversion circuit including a boost circuit 1, a charge pump circuit 2, and a control circuit 3.

The boost circuit 1 comprises an inductor L1, a first diode D1, and a first capacitor C1; the charge pump circuit 2 comprises a second capacitor C2, a third capacitor C3, a second diode D2, a third diode D3, and a triode Tr1; and the control circuit 3 comprises a switch module 301, an AND gate Y1, a first current detection module 201, a second current detection module 202, a boost control module 101, and a charge pump control module 102.

In details, a first end of the inductor L1 is connected to an input voltage Vin, and a second end of the inductor L1 is electrically connected to a first node A; an anode of the first diode D1 is electrically connected to the first node A, and a cathode of the first diode D1 is configured to output an analog power voltage VAA; a first end of the first capacitor C1 is electrically connected to the cathode of the first diode D1, and a second end of the first capacitor C1 is grounded; a first end of the second capacitor C2 is electrically connected to the first node A, and a second end of the second capacitor C2 is electrically connected to a cathode of the second diode D2; an anode of the second diode D2 is electrically connected to the cathode of the first diode D1; an anode of the third diode Tr1 is electrically connected to the cathode of the second diode D2, and a cathode of the third diode Tr1 is electrically connected to a first end of the third capacitor C3; a second end of the third capacitor C3 is grounded; a base of the triode Tr1 is electrically connected to the charge pump control module 102, an emitter of the triode Tr1 is electrically connected to the cathode of the third diode Tr1, and a collector of the triode Tr1 is configured to output a gate turn-on voltage VGH.

In details, a control end of the switch module 301 is electrically connected to a first end of the boost control module 101, the first end of the boost control module 101 is electrically connected to the first node A, and a second end of the boost control module 101 is grounded; the second end of the boost control module 101 is electrically connected to an output end of the AND gate Y1.

The first current detection module 201 is configured to collect a first current, when the first current is greater than a preset first comparison current, the first current detection module 201 provides a low level to a first input end of the AND gate Y1, and when the first current is less than the preset first comparison current, the first current detection module provides a high level to the first input end of the AND gate Y1, the first current is a current connected to a second end of the switch module 301.

The second current detection module 202 is configured to collect a second current, when the second current is greater than a preset second comparison current, the second current detection module provides a high level to a second input end of the AND gate Y1, and when the second current is less than the preset second comparison current, the second current detection module 202 provides a low level to the second input end of the AND gate Y1, the second current is a current connected to the collector of the triode Tr1.

The boost control module 101 is configured to control on and off of the switch module 301, and control a switching frequency of the switch module 301 according to a level of the output end of the AND gate Y1, when a level of the output end of the AND gate Y1 is low, the boost control module 101 controls the switch module 301 to maintain a current switching frequency, and when the level of the output end of the AND gate Y1 is high, the boost control module 101 controls the switch module 301 to increase the current switching frequency.

The charge pump control module 102 is configured to control on and off of the triode Tr1.

Figure 2:
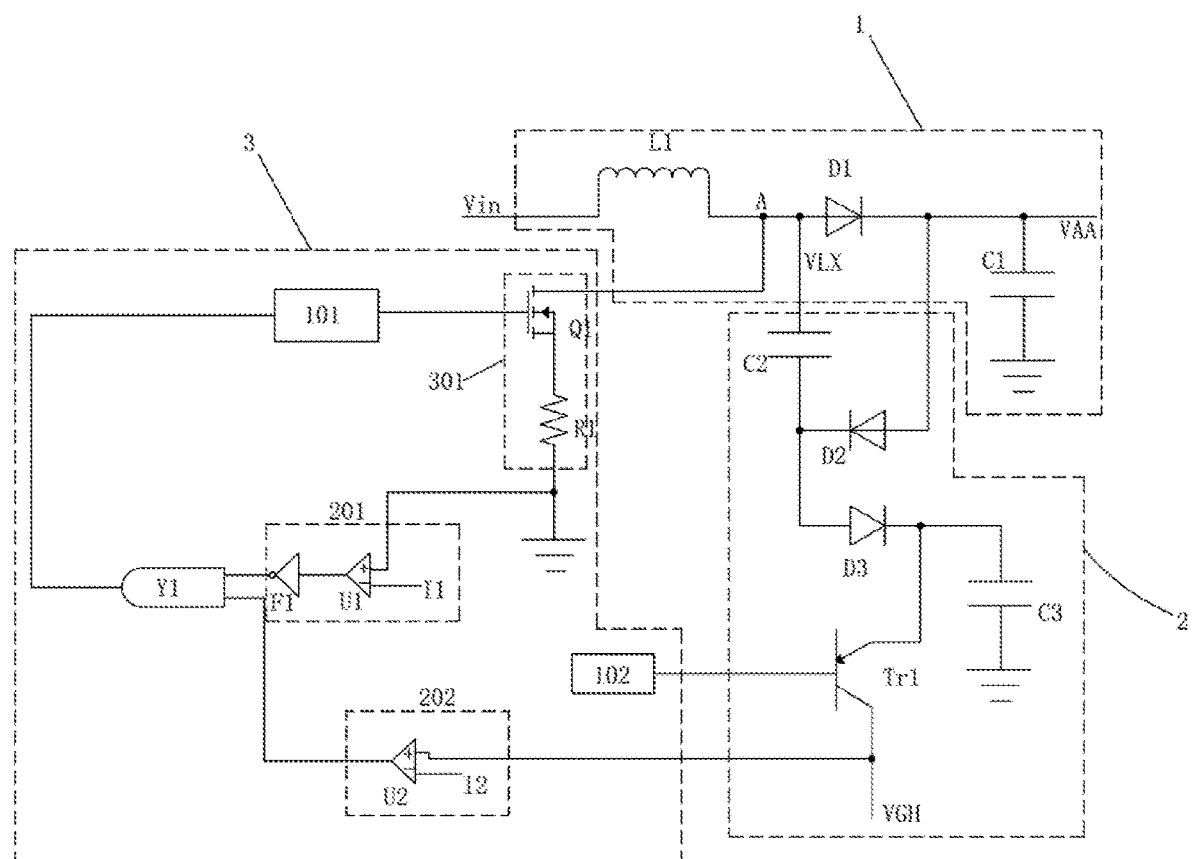
FIG. 2 is a circuit diagram of a DC voltage conversion circuit of the present invention.

Preferably, as shown in FIG. 2, the first current detection module 201 comprises a first current comparator U1 and an inverter F1. A non-inverting input end of the first current comparator U1 is electrically connected to the second end of the switch module 301, an inverting input end of the first current comparator U1 is connected to a first comparison current I1, and an output end of the first current comparator U1 is electrically connected to an input end of the inverter F1; an output end of the inverter F1 is electrically connected to the first input end of the AND gate Y1, so that when the first current is greater than the preset first comparison current I1, a low level is provided to the first input end of the AND gate Y1, and when the first current is less than the preset first comparison current I1, a high level is supplied to the first input of the AND gate Y1.

Preferably, the second current detection module 202 comprises a second current comparator U2. A non-inverting input end of the second current comparator U2 is electrically connected to the collector of the triode Tr1, an inverting input end of the second current comparator U2 is connected to a second reference current I2, and an output end of the second current comparator U2 is electrically connected to the second input end of the AND gate Y2, so that when the second current is greater than a preset second comparison current I2, a high level is provided to the second input end of the AND gate Y1, and when the second current is less than the preset second comparison current I2, a low level is supplied to the second input end of the AND gate Y1.

In details, the control circuit 3 is integrated in a power manage IC (PMIC). Preferably, the first diode D1, the second diode D2, and the third diode D3 are Schottky diodes.

Further, the switch module 301 comprises a MOS transistor Q1 and a resistor R1. A gate of the MOS transistor Q1 is electrically connected to the boost control module 101, a source of the MOS transistor Q1 is electrically connected to a first end of the resistor R1, and a drain of the MOS transistor Q1 is electrically connected to the first node A; a second end of the resistor R1 is grounded. Correspondingly, the gate of the MOS transistor is the control end of the switch module 301, the drain of the MOS transistor is the first end of the switch module 301, and the second end of the resistor R1 is the second end of the switch module 301.

Figure 3:
FIG. 3 is a waveform diagram of a driving voltage VLX when a boost circuit is at a light load and a charge pump circuit is under heavy load in a DC voltage conversion circuit of the present invention.

It should be noted that, in conjunction with FIG. 1 and FIG. 3, a working process of the DC voltage conversion circuit of the present invention is: First, the boost control module 101 controls the switch module 301 to open, the first diode D1 is turned off, current of the inductor L1 continues to increase, and the inductor L1 stores energy. Then, the boost control module 101 controls the switch module 301 to be turned off, and the first diode D1 is turned on. The inductor L1 charges the first capacitor C1 through the first diode D1, thereby completing boosting of the input voltage Vin. The analog power supply voltage VAA is output, the switch module 301 is repeatedly switched to continuously output the analog power supply voltage VAA. At the same time, the charge pump circuit 2 obtains the driving voltage VLX from the first node A, and generates the gate turn-on voltage VGH when the analog power supply voltage VAA is boosted by the driving voltage VLX. Specifically, the second capacitor C2 and the third capacitor C3 are charged by the driving voltage VLX, so that voltage of the cathode of the third diode D3 rises, thereby generating the gate turn-on voltage VGH. More importantly, because the boost circuit 1 enters the discontinuous mode under a light load condition. The DC voltage conversion circuit of the present invention detects the first current and the second current during operation of the boost circuit 1 and the charge pump circuit 2, and determines load states of the boost circuit 1 and the charge pump circuit 2 according to magnitude of the first current and the second current. Specifically, when the first current is greater than the preset first comparison current I1, determining that the boost circuit 1 is in a heavy load state, does not enter the discontinuous mode, and supplies a low level to the first input end of the AND gate Y1. When the first current is less than the preset first comparison current I1, determining that the boost circuit 1 is in a light load state, enters a discontinuous mode, and supplies a high level to the first input end of the AND gate Y1. When the second current is greater than the preset second comparison current I2, the charge pump circuit 2 is in a heavy load state, and requires the driving voltage VLX with a strong driving capability, and supplies a high level to the second input end of the AND gate Y1. When the second current is less than the preset second comparison current I2, the charge pump circuit 2 is in a light load state, does not require a driving power VLX with a strong driving capability, and supplies a low level to the second input end of the AND gate Y1. The boost control module 101 controls the switching frequency of the switch module 301 according to the level of the output end of the AND gate Y1. When the level of the output end of the AND gate Y1 is a high level, that is, the boost circuit 1 is in a light load state and the charge pump circuit 2 is in a heavy load state, the boost control module 101 controls the switch module 301 to boost the current switching frequency to improve the driving capability of the driving voltage VLX, and ensures that the VGH can stably drive the load. When the level of the output end of the AND gate Y1 is a low level, that is, except for the case where the boost circuit 1 is in a light load state and the charge pump circuit 2 is in a heavy load state, the boost control module 101 controls the switch module 301 to maintain the current switching frequency. At this time, the VGH can also stably drive the load, so that the present invention can automatically adjust the switching frequency of the switch module according to the load of the boost circuit 1 and the charge pump circuit 2, thereby ensuring normal operation of the charge pump circuit.

Figure 4:
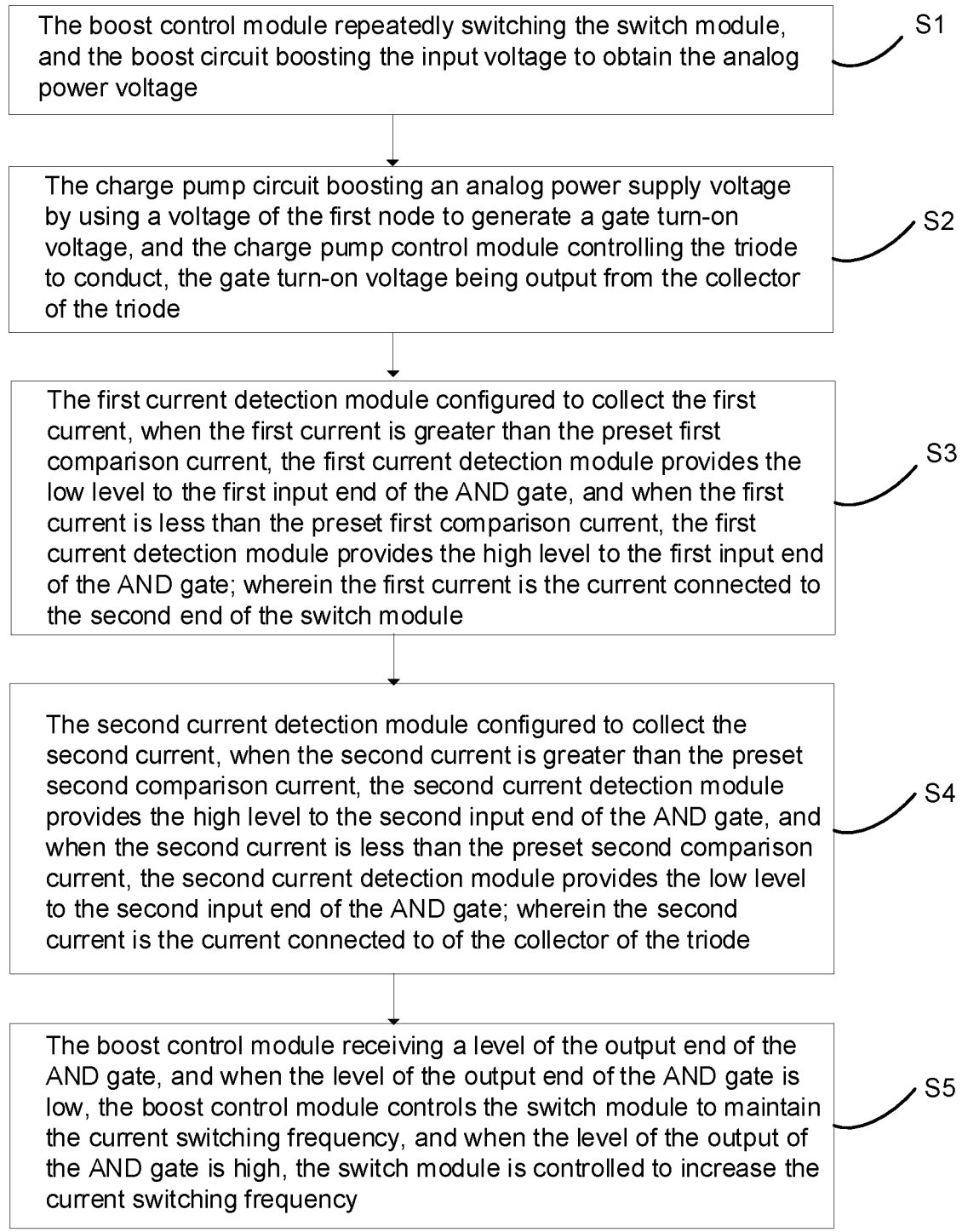
FIG. 4 is a flowchart of a DC voltage conversion method of the present invention.

Referring to FIG. 4, the present invention further provides a DC voltage conversion method, which is applied to the DC voltage conversion circuit described above, and includes the following steps:

Step S1, the boost control module 101 repeatedly switching the switch module 301, and the boost circuit 1 boosting the input voltage Vin to obtain the analog power voltage VAA;

Step S2, the charge pump circuit 2 boosting the analog power supply voltage VAA by using a voltage of the first node A to generate a gate turn-on voltage VGH, and the charge pump control module 102 controlling the triode Tr1 to conduct, the gate turn-on voltage VGH being output from the collector of the triode Tr1;

Step S3, the first current detection module 201 configured to collect the first current, when the first current is greater than the preset first comparison current, the first current detection module 201 provides the low level to the first input end of the AND gate Y1, and when the first current is less than the preset first comparison current, the first current detection module 201 provides the high level to the first input end of the AND gate Y1, wherein the first current is the current connected to the second end of the switch module 301;

Step S4, the second current detection module 202 configured to collect the second current, when the second current is greater than the preset second comparison current, the second current detection module 202 provides the high level to the second input end of the AND gate Y1, and when the second current is less than the preset second comparison current, the second current detection module 202 provides the low level to the second input end of the AND gate Y1; wherein the second current is the current connected to of the collector of the triode Tr1;

Step S5, the boost control module 101 receiving a level of the output end of the AND gate Y1, and when the level of the output end of the AND gate Y1 is low, the boost control module 101 controls the switch module 301 to maintain the current switching frequency, and when the level of the output of the AND gate Y1 is high, the switch module 301 is controlled to increase the current switching frequency.

The present further provides a liquid crystal display device comprising the above DC voltage conversion circuit.

In summary, the present invention provides a DC voltage conversion circuit comprising a boost circuit, a charge pump circuit, and a control circuit. A first current detection module, a second current detection module, and an AND gate are added to the control circuit. A first current is detected in the boost circuit by the first current detection module, and a high level or a low level is provided to a first input end of the AND gate according to magnitude of the first current. A second current is detected in the charge pump circuit by the second current detection module, and a high level or a low level is provided to a second input end of the AND gate according to magnitude of the second current. Level of an output end of the AND gate controls the switch module to be smaller at the first current and larger at the second current, that is, when the boost circuit is lightly loaded and the charge pump circuit s is under heavy load, a switching frequency of the switch module is raised to ensure a normal operation of the charge pump circuit, thereby improving stability of VGH voltage. The present invention further provides a DC voltage conversion method capable of automatically adjusting a switching frequency of a switch module according to a load of the boost circuit and a charge pump circuit to ensure normal operation of the charge pump circuit. The present invention further provides a liquid crystal display device capable of automatically adjusting a switching frequency of a switch module according to a load of a boost circuit and a charge pump circuit to ensure normal operation of the charge pump circuit.

In the above, various other suitable changes and modifications can be made by those skilled in the art in light of the technical solutions and technical concept of the invention. All such changes and modifications are intended to be included within the scope of the appended claims.

What is claimed is:

1. A direct current (DC) voltage conversion circuit, comprising:
   a boost circuit, a charge pump circuit, and a control circuit;
   wherein the boost circuit comprises an inductor, a first diode, and a first capacitor; the charge pump circuit comprises a second capacitor, a third capacitor, a second diode, a third diode, and a triode; and the control circuit comprises a switch module, an AND gate, a first current detection module, a second current detection module, a boost control module, and a charge pump control module;

wherein a first end of the inductor is connected to an input voltage, and a second end of the inductor is electrically connected to a first node; an anode of the first diode is electrically connected to the first node, and a cathode of the first diode is configured to output an analog power voltage; a first end of the first capacitor is electrically connected to the cathode of the first diode, and a second end of the first capacitor is grounded; a first end of the second capacitor is electrically connected to the first node, and a second end of the second capacitor is electrically connected to a cathode of the second diode; an anode of the second diode is electrically connected to the cathode of the first diode; an anode of the third diode is electrically connected to the cathode of the second diode, and a cathode of the third diode is electrically connected to a first end of the third capacitor; a second end of the third capacitor is grounded; a base of the triode is electrically connected to the charge pump control module, an emitter of the triode is electrically connected to the cathode of the third diode, and a collector of the triode is configured to output a gate turn-on voltage;

wherein a control end of the switch module is electrically connected to a first end of the boost control module, the first end of the boost control module is electrically connected to the first node, and a second end of the boost control module is grounded; the second end of the boost control module is electrically connected to an output end of the AND gate; the first current detection module is configured to collect a first current, when the first current is greater than a preset first comparison current, the first current detection module provides a low level to a first input end of the AND gate, and when the first current is less than the preset first comparison current, the first current detection module provides a high level to the first input end of the AND gate; the first current is a current connected to a second end of the switch module;

wherein the second current detection module is configured to collect a second current, when the second current is greater than a preset second comparison current, the second current detection module provides a high level to a second input end of the AND gate, and when the second current is less than the preset second comparison current, the second current detection module provides a low level to the second input end of the AND gate; the second current is a current connected to the collector of the triode;

wherein the boost control module is configured to control on and off of the switch module, and control a switching frequency of the switch module according to a level of the output end of the AND gate, when a level of the output end of the AND gate is low, the boost control module controls the switch module to maintain a current switching frequency, and when the level of the output end of the AND gate is high, the boost control module controls the switch module to increase the current switching frequency; and wherein the charge pump control module is configured to control on and off of the triode.

2. The DC voltage conversion circuit according to claim 1, wherein the first current detection module comprises a first current comparator and an inverter;

a non-inverting input end of the first current comparator is electrically connected to the second end of the switch module, an inverting input end of the first current comparator is connected to a first comparison current, and an output end of the first current comparator is electrically connected to an input end of the inverter; an output end of the inverter is electrically connected to the first input end of the AND gate.

3. The DC voltage conversion circuit according to claim 1, wherein the second current detection module comprises a second current comparator;

a non-inverting input end of the second current comparator is electrically connected to the collector of the triode, an inverting input end of the second current comparator is connected to a second reference current, and an output end of the second current comparator is electrically connected to the second input end of the AND gate.

4. The DC voltage conversion circuit according to claim 1, wherein the control circuit is integrated in a power manage IC.

5. The DC voltage conversion circuit according to claim 1, wherein the first diode, the second diode, and the third diode are Schottky diodes.

6. The DC voltage conversion circuit according to claim 1, wherein the switch module comprises a MOS transistor and a resistor;

a gate of the MOS transistor is electrically connected to the boost control module, a source of the MOS transistor is electrically connected to a first end of the resistor, and a drain of the MOS transistor is electrically connected to the first node; a second end of the resistor is grounded;

the gate of the MOS transistor is the control end of the switch module, the drain of the MOS transistor is the first end of the switch module, and the second end of the resistor is the second end of the switch module.

7. A DC voltage conversion method applied to the DC voltage conversion circuit of claim 1 comprising following steps:

Step S1, the boost control module repeatedly switching the switch module, and the boost circuit boosting the input voltage to obtain the analog power voltage;

Step S2, the charge pump circuit boosting an analog power supply voltage by using a voltage of the first node to generate a gate turn-on voltage, and the charge pump control module controlling the triode to conduct, the gate turn-on voltage being output from the collector of the triode;

Step S3, the first current detection module configured to collect the first current, when the first current is greater than the preset first comparison current, the first current detection module provides the low level to the first input end of the AND gate, and when the first current is less than the preset first comparison current, the first current detection module provides the high level to the first input end of the AND gate; wherein the first current is the current connected to the second end of the switch module;

Step S4, the second current detection module configured to collect the second current, when the second current is greater than the preset second comparison current, the second current detection module provides the high level to the second input end of the AND gate, and when the second current is less than the preset second comparison current, the second current detection module provides the low level to the second input end of the AND gate; wherein the second current is the current connected to of the collector of the triode; and Step S5, the boost control module receiving a level of the output end of the AND gate, and when the level of the output end of the AND gate is low, the boost control module controls the switch module to maintain the current switching frequency, and when the level of the output of the AND gate is high, the switch module is controlled to increase the current switching frequency.

8. A liquid crystal display device comprising the DC voltage conversion circuit according to claim 1.

* * * * *